US012688595B2

(12) United States Patent
Vorobyev et al.

(10) Patent No.: US 12,688,595 B2
(45) Date of Patent: Jul. 21, 2026

(54) DETERMINING DEPTH MAPS FROM IMAGES

(71) Applicant: HUAWEI TECHNOLOGIES CO., LTD., Shenzhen (CN)

(72) Inventors: Evgeny Victorovich Vorobyev, Moscow (RU); Dmitry Petrovich Nikolaev, Moscow (RU); Anton Sergeevich Grigoriev, Moscow (RU); Anna Alexandrovna Smagina, Moscow (RU); Denis Alexandrovich Shepelev, Moscow (RU); Mikhail Konstantinovich Tchobanou, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 300 days.

(21) Appl. No.: 18/511,732

(22) Filed: Nov. 16, 2023

(65) Prior Publication Data

US 2024/0169569 A1      May 23, 2024

Related U.S. Application Data

(63) Continuation of application No. PCT/RU2021/000202, filed on May 19, 2021.

(51) Int. Cl.
| | |
|---|---|
| *G06T 7/50* | (2017.01) |
| *G06T 5/20* | (2006.01) |
| *G06T 7/90* | (2017.01) |

(52) U.S. Cl.
CPC .................. *G06T 7/50* (2017.01); *G06T 5/20* (2013.01); *G06T 7/90* (2017.01); *G06T 2207/10024* (2013.01)

(58) Field of Classification Search
CPC .... G06T 7/50; G06T 5/20; G06T 7/90; G06T 2207/10024; G06T 5/92; G06T 5/70;
(Continued)

(56) References Cited

U.S. PATENT DOCUMENTS

| | | | |
|---|---|---|---|
| 9,753,140 B2 * | 9/2017 | Cottrell | ................. G01S 17/894 |
| 10,163,213 B2 | 12/2018 | Boyle et al. | |

(Continued)

FOREIGN PATENT DOCUMENTS

| | | | | | |
|---|---|---|---|---|---|
| CN | 105761227 A | * | 7/2016 | .............. | G06T 3/40 |
| CN | 106991663 A | * | 7/2017 | .............. | G06T 5/70 |

(Continued)

OTHER PUBLICATIONS

Li, Chongyi et al. "Underwater image restoration based on minimum information loss principle and optical properties of underwater imaging." 2016 IEEE International Conference on Image Processing (ICIP), pp. 1993-1997, IEEE, Sep. 30, 2016. (Year: 2016).*

(Continued)

*Primary Examiner* — Jose L Couso
(74) *Attorney, Agent, or Firm* — Leydig, Voit & Mayer, Ltd.

(57) ABSTRACT

A method generates a depth map from an image. In the method, a first depth data is generated that represents a first measure proportional to depth for pixels in the image using a first selected colour channel of the image, where the first depth data is calculated based on a minimum in intensity of the first selected colour channel of the image. A second depth data is generated that represents a second measure proportional to depth for pixels in the image, where the second depth data is calculated based on a maximum attenuation of a second selected colour channel of the image. The second depth data is filtered using the first depth data as a filtering guide to generate the depth map.

20 Claims, 4 Drawing Sheets

(58) Field of Classification Search

CPC .... G06T 5/77; G06T 7/70; G06T 7/73; G06T 2207/10016; G06T 2207/20221; G06T 2207/20224; G06T 2207/20172; G06T 2207/10028; G06T 2207/10021; G06T 7/254; G06T 7/223; G06T 7/55; G06T 7/80; Y02A 90/30; G06V 10/16; G06V 10/20; G06V 10/30; G06V 10/34; G06V 20/05

See application file for complete search history.

(56) References Cited

U.S. PATENT DOCUMENTS

| | | | |
|---|---|---|---|
| 2007/0274604 A1 | 11/2007 | Schechner et al. | |
| 2018/0286066 A1* | 10/2018 | Peng | H04N 23/951 |
| 2019/0089869 A1* | 3/2019 | Fleizach | H04N 1/6027 |
| 2019/0114747 A1* | 4/2019 | Treibitz | G06F 18/22 |
| 2021/0319541 A1* | 10/2021 | Treibitz | G06N 3/045 |
| 2023/0112169 A1* | 4/2023 | Bekerman | G06T 5/40 |
| | | | 382/162 |

FOREIGN PATENT DOCUMENTS

| | | | | | |
|---|---|---|---|---|---|
| CN | 107403418 A | * | 11/2017 | ............... | G06T 7/90 |
| CN | 108921887 A | * | 11/2018 | ............... | G06T 7/50 |
| CN | 109272475 A | * | 1/2019 | ............... | G06T 7/90 |
| CN | 105761227 B | | 2/2019 | | |
| CN | 109410180 A | * | 3/2019 | ........... | G06T 7/0002 |
| CN | 109688382 A | * | 4/2019 | ............... | G06T 5/40 |
| CN | 109741285 A | * | 5/2019 | | |
| CN | 110135434 A | * | 8/2019 | ......... | G06F 18/2135 |
| CN | 110766616 A | * | 2/2020 | ............... | G06T 5/77 |
| CN | 111292418 A | * | 6/2020 | ............... | G06T 7/55 |
| CN | 111652817 A | * | 9/2020 | ............... | G06T 5/73 |
| CN | 112488955 A | * | 3/2021 | ............... | G06T 5/00 |
| GB | 2585197 A | * | 1/2021 | ............... | G06T 7/85 |

OTHER PUBLICATIONS

Akkaynak et al., "Sea-Thru: A Method for Removing Water From Underwater Images," Proceedings of the IEEE Conferenceon Computer Vision and Pattern Recognition, Proceedings of the IEEE Conference on Computer Vision and Pattern Recognition, total 10 pages (Jun. 2019).

Xiao et al., "Fast image dehazing using guided joint bilateral filter," The Visual Computer; International Journal of Computer Graphics, Springer, Berlin, DE, vol. 28, No. 68, XP035059741, Total 9 pages (Apr. 25, 2012).

Bryson et al., "Characterization of measurement errors using structure-from-motion and photogrammetry to measure marine habitat structural complexity," Ecology and Evolution, Wiley, Accepted May 2017, total 13 pages (Jun. 2017).

Schechner et al., "Recovery of Underwater Visibility and Structure by Polarization Analysis," IEEE Journal of Oceanic Engineering, vol. 30, No. 3, Total 18 pages (Jul. 2005).

Drews et al., "Transmission estimation in underwater single images," Proceedings of the IEEE international conference on computer vision workshops, Total 6 pages (Dec. 2013).

Carlevaris-Bianco et al., "Initial results in underwater single image dehazing," Oceans 2010 MTS/IEEE Seattle, Total 8 pages (Sep. 2010).

Yang et al., "Low Complexity Underwater Image Enhancement Based on Dark Channel Prior," 2011 Second International Conference on Innovations in Bio-inspired Computing and Applications, Total 4 pages (Dec. 2011).

Chiang et al., "Underwater Image Enhancement by Wavelength Compensation and Dehazing," IEEE Transactions on Image Processing vol. 21, No. 4, Total 14 pages (Apr. 2012).

Peng et al., "Single underwater image enhancement using depth estimation based on blurriness," 2015 IEEE International Conference on Image Processing (ICIP), total 5 pages (Sep. 2015).

Peng, "Underwater Image Restoration Based on Image Blurriness and Light Absorption," IEEE Transactions on Image Processing vol. 26, No. 4, Total 16 pages (Apr. 2017).

Levin et al., "A Closed-Form Solution to Natural Image Matting," Proceedings of the 2006 IEEE Computer Society Conference on Computer Vision and Pattern Recognition, Washington, DC, USA, CVPR06, IEEE Computer Society, Total 8 pages (Jun. 2006).

Shepelev, "Methods for modeling color underwater images based on RGB-D surface scenes," Dissertation for scientific degree, Moscow Institute of Physics and Technology, Total 278 pages (Oct. 2020). With English Translation.

He et al., "Guided Image Filtering," IEEE Transactions on Pattern Analysis and Machine Intelligence, vol. 35, No. 6, 2 Published Oct. 2012, total 13 pages (Jun. 2013).

Berman et al., "Underwater Single Image Color Restoration Using Haze-Lines and a New Quantitative Dataset," IEEE Transactions on Pattern Analysis and Machine Intelligence, arXiv preprint arXiv:1811. 01343v2, Total 14 pages (Nov. 2018).

* cited by examiner

DETERMINING DEPTH MAPS FROM IMAGES

CROSS-REFERENCE TO RELATED APPLICATIONS

This application is a continuation of International Application No. PCT/RU2021/000202, filed on May 19, 2021, the disclosure of which is hereby incorporated by reference in its entirety.

FIELD

The present disclosure relates, in general, to image processing. Aspects of the disclosure relate to a method for determining a depth map from an image, which depth map may be used for the purposes of image dehazing and/or colour correction for an image captured in a turbid or underwater environment.

BACKGROUND

With the increasing level of sophistication and ingress protection ratings of user equipment, such as smart phones comprising camera modules for example, users are able to capture images with such devices in ways that were not possible before. For example, the use such devices to capture images and videos underwater is increasing. However, underwater images or videos often suffer from visible degradation and color distortion due to the attenuation of propagated light due to absorption and scattering, the effects of which become more pronounced with increasing distance from the camera and with increasing turbidity of the medium in question. This can result in captured images and videos suffering from poor contrast and often displaying undesirable colour casts.

The degradation of images captured in turbid media, such as underwater for example, is dependent on, amongst other things, the distance of elements in a scene or of an object from the camera. Recovery of such degraded images therefore often relies on an estimation of depth of a scene in an image. There are various ways in which depth in an image can be estimated. For example, it can be calculated using multiple images, such as multiple images captured under different environmental conditions, by way of stereo images or using polarization filters for example. However, such methods generally rely on specialized hardware which is expensive and complex, and which can be difficult to implement. Furthermore, the necessity to capture multiple images is generally a drawback since, for example, capturing several images of the same scene but taken under different environmental conditions is difficult to implement in real conditions, particularly underwater for example.

Single image methods of recovering the depth of a scene in an image generally rely on methodologies based on the statistics observed in respect of haze-free images taken in outdoor environments. For example, it is generally observed that haze-free outdoor images have pixels in which at least one RGB colour channel has a low intensity value. This observation has led to, e.g., a Dark Channel Prior, in which dark pixels derived from an image are used to provide a depth estimation. However, methods of image recovery using this methodology have either object color dependence or low spatial resolution.

SUMMARY

Aspects of the present disclosure provide a method and apparatus for determining depth information from an image that can be used to dehaze and/or remove a colour cast of the image that results from its capture in a participating medium, such as water for example.

A first aspect of the present disclosure provides a method for generating a depth map from an image, the method comprising generating first depth data representing a first measure proportional to depth for pixels in the image using a first selected colour channel of the image, the first depth data calculated on the basis of a minimum intensity of the first selected colour channel of the image, generating second depth data representing a second measure proportional to depth for pixels in the image, the second depth data calculated on the basis of a maximum attenuation of a second selected colour channel of the image, and filtering the second depth data using the first depth data as a filtering guide to generate the depth map.

Thus, a depth map can be generated using two depth data sources, each of which has complementary characteristics. One source of depth data can provide a measure of depth in the image that has good spatial resolution but with a relatively poor range estimation, whilst the other source of depth data can provide a measure that has good range value determination but relatively poor spatial resolution. The combination of the two depth data sources results in a depth map for the image that is superior to both input depth maps in terms of its spatial resolution and range estimation for the image and there is object colour boundary confusion.

One source of depth data (e.g., the first depth data) can be based on the dark channel prior assumption or a modification thereof, whilst the other (e.g., the second depth data) can be based on the maximum intensity prior assumption or a modification thereof.

In an implementation of the first aspect, the depth map can be generated from a single image. Since a single captured image can be used to generate the first and second depth data, no additional hardware is needed.

In an implementation of the first aspect, at least one of the first and second selected colour channels of the image is the colour channel of the image with the largest amount of attenuation. At least one of the first and second selected colour channels of the image can be determined on the basis of an image characteristic. For example, the image characteristic can comprise at least one of a dominant image colour, hue or tone.

In an example, at least one of the methods for generating depth data is independent of the global colour of the participating medium, e.g., it is not dependent on water colour, and at least one of the methods for generating depth data is independent of water parameters.

In an example, for the first depth data, a minimum intensity for each pixel in the image in the first selected colour channel can be determined in order to generate an intermediate image representation, which can represent the dark channel of the image for example. The intermediate image representation can be filtered using a selected filtering kernel to generate the first depth data. The selected filtering kernel can comprise a windowed morphological filter or a rank filter.

In an example, for the second depth data, a value representing a difference between a most intense value in the second selected colour channel of the image and a secondary value in a further selected colour channel of the image can be calculated. The secondary value can comprise a most intense value in the further selected colour channel of the image. The value can be calculated over a set of colour channels of the image, such as RGB colour channels of the image for example.

In an implementation of the first aspect, the first depth data is generated on the basis of a modified dark channel prior.

In an implementation of the first aspect, the second depth data is generated on the basis of a modified maximum intensity prior.

At least one of the first and second selected colour channels of the image can be determined using a colour sensor, such as a colour sensor or an imaging module of an image capture device for example.

A second aspect of the present disclosure provides a non-transitory machine-readable storage medium encoded with instructions for generating a depth map for an image, the instructions executable by a processor of a machine whereby to cause the machine to generate first depth data representing a first measure proportional to depth for pixels in the image using a first selected colour channel of the image, the first depth data calculated on the basis of a minimum intensity of the first selected colour channel of the image, generate second depth data representing a second measure proportional to depth for pixels in the image, the second depth data calculated on the basis of a maximum attenuation of a second selected colour channel of the image, and filter the second depth data using the first depth data as a filtering guide, to generate the depth map.

A third aspect of the present disclosure provides user equipment comprising an image sensor configured to generate image data representing an image, the user equipment further comprising a processor, and a memory to store instructions, executable by the processor, whereby to cause the user equipment to determine, on the basis of the image data, a colour channel representing a most attenuated colour channel of the image, using the colour channel, generate first and second depth map data for the image, the first depth map data defined by a minimum intensity of the colour channel, the second depth map defined by a difference in attenuation between different colour channels of the image at least of which comprising the colour channel representing a most attenuated colour channel of the image, and filter the second depth data using the first depth data as a guide to generate a depth map for the image.

In an implementation of the third aspect, the user equipment can comprise a mobile device such as a smart phone for example.

A fourth aspect of the present disclosure provides an apparatus for generating a depth map from an image, the apparatus being configured to generate first depth data representing a first measure proportional to depth for pixels in the image using a first selected colour channel of the image, the first depth data calculated on the basis of a minimum intensity of the first selected colour channel of the image, generate second depth data representing a second measure proportional to depth for pixels in the image, the second depth data calculated on the basis of a maximum attenuation of a second selected colour channel of the image, and filter the second depth data using the first depth data as a filtering guide to generate the depth map.

In an implementation of the fourth aspect, the apparatus can comprise a mobile device such as a smart phone for example. The apparatus can comprise an image capture device such as a camera for example.

The apparatus can comprise an imaging module to generate image data representing the image. The apparatus can determine at least one of the first and second selected colour channels of the image on the basis of an image characteristic, such as at least one of a dominant image colour, hue or tone. The apparatus can determine a minimum intensity for each pixel in the image in the first selected colour channel to generate an intermediate image representation, and filter the intermediate image representation using a selected filtering kernel to generate the first depth data. The apparatus can, for the second depth data, calculate a value representing a difference between a most intense value in the second selected colour channel of the image and a secondary value in a further selected colour channel of the image.

In an implementation of the fourth aspect, the apparatus can generate the first depth data on the basis of a modified dark channel prior.

In an implementation of the fourth aspect the apparatus can generate the second depth data on the basis of a modified maximum intensity prior.

The apparatus can further comprise a colour sensor to determine at least one of the first and second selected colour channels of the image.

These and other aspects of the present disclosure will be apparent from the embodiment(s) described below.

BRIEF DESCRIPTION OF THE DRAWINGS

In order that aspects of the present disclosure may be more readily understood, exemplary embodiments of the present disclosure will now be described, by way of example, with reference to the accompanying drawings, in which.

DETAILED DESCRIPTION

Figure 1:
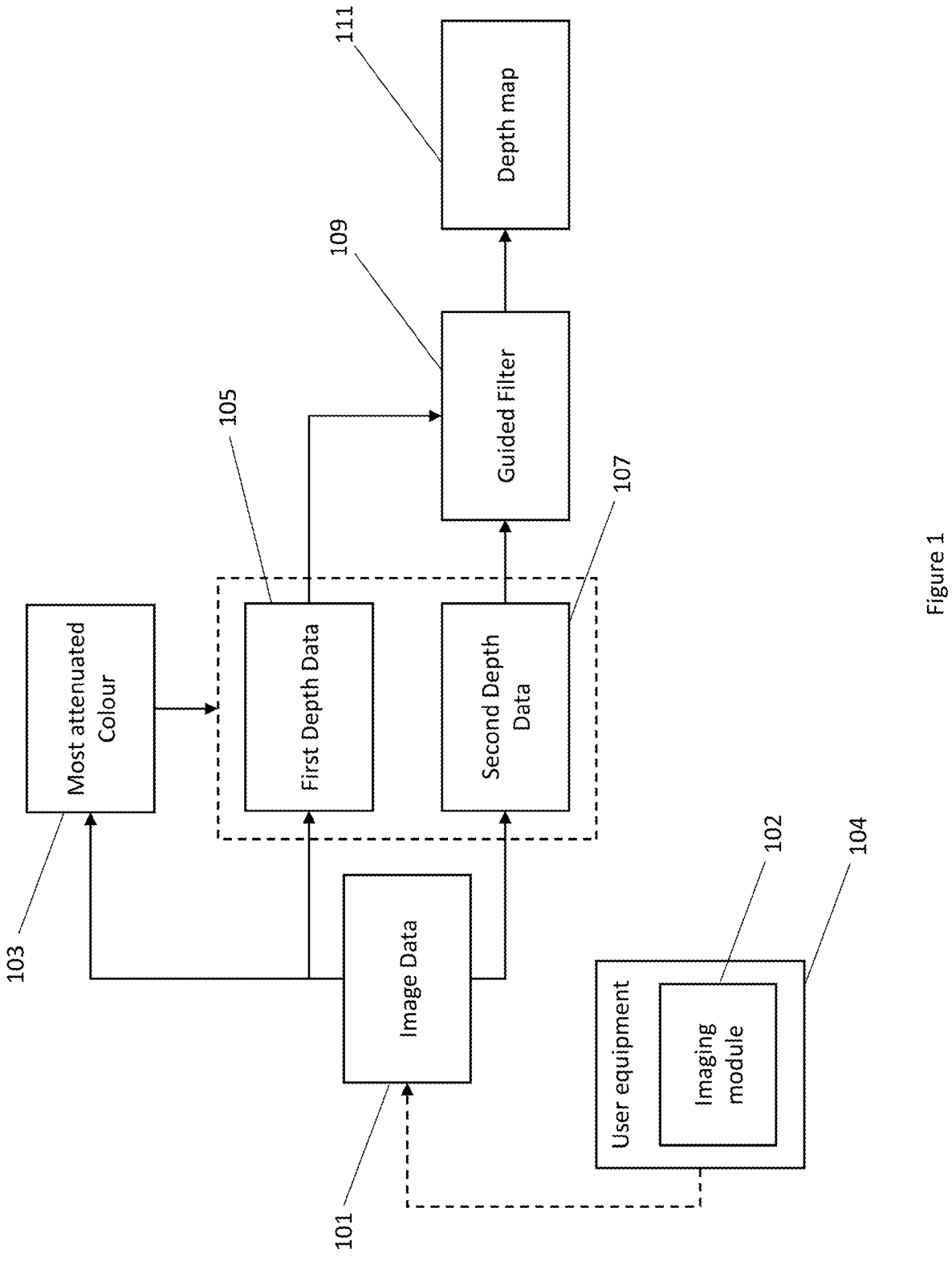
FIG. 1 is a schematic representation of a method for generating a depth map from an image according to an example.

Images captured in a participating medium within which a camera apparatus is immersed or provided, such as turbid medium (e.g., water), can often be described as being 'hazy', i.e., lacking in contrast and/or including undesirable colour casts, both of which can lead to reductions in visibility but which more generally mean that an image captured in such a participating medium is not an accurate reflection of the scene as it would have been viewed if the camera were not immersed in that specific medium.

In order to recover a 'clear image', in which haze and colour casts are removed, or at least reduced to enable the image to tend to a more accurate version, images captured by a camera can be modelled as being composed of two components: the direct transmission of light from the object and the transmission of light due to scattering by the particles of the participating medium, referred to as 'airlight', which represents global light in the scene. In the context of underwater images, airlight may be considered to derive from, e.g., homogenous skylight entering from above into the water thereby providing a source of illumination in the underwater environment. The formalisation of this model can be written as:

$$W(x) = J(x)t(x) + (1-t(x))A \qquad (1)$$

where $x = (x, y)$ is a pixel of the captured image, $W(x)$ is the observed image intensity, $J(x)$ is the scene radiance, representing the clear (i.e., a desired) image, A is the airlight, and t(x) is the transmission, which is given by:

$$t(x)=\exp(-\beta d(x))$$

Here, d(x) is scene depth and $\beta$ is an attenuation coefficient that arises due to scattering in the medium in the question. The observed image intensity, W(x), scene radiance, J(x), and airlight, A, are all vectors in $\Re^3$ with one intensity value per color channel. The attenuation coefficient due to scattering, $\beta$, is not a function of the color channel and therefore, for a given pixel, the transmission is constant over all three color channels.

The constant A can be estimated in different ways. For example, it may be estimated using calibration, by finding the farthest pixel in a scene, by finding the brightest pixel in an image or by finding the brightest pixel in the dark channel of an image. For example, the pixel in an image with the minimum estimated transmission represents the point in the image that is farthest from the camera. The intensity values at this location in the original image can then be used as the airlight estimate. Thus, assuming that a good estimate of the airlight can be obtained, there are two unknowns to solve for: the transmission, t(x), which captures the depth of the scene, and J(x), representing the clear image, which is the goal for, e.g., dehazing the captured image.

In the context of underwater images for example, as noted above, the effects of haze are highly correlated with the range depth of an underwater scene. That is, the farther away an object is from the image capture device, the hazier it will appear in the captured image. Therefore, given that there will exist an estimate for the airlight, an accurate estimate of the scene depth can be used to dehaze an image, since:

$$J(x) = \frac{W(x) - A}{t(x)} + A$$

According to an example, a method for generating an estimate of the scene depth of an image is provided in the form of a depth map generated using a pair of depth estimates. Each of the pair of depth estimates can be calculated from a single image. One of the depth estimates may provide accurate range information, but has somewhat imprecise object boundaries, whilst the other depth estimate may provide somewhat imprecise range estimates but with good object boundaries. A first depth estimate can comprise first depth data representing a first measure proportional to depth for pixels in the image using a first selected colour channel of the image and calculated on the basis of a minimum intensity of the first selected colour channel of the image. A second depth estimate can comprise second depth data representing a second measure proportional to depth for pixels in the image and calculated on the basis of a maximum attenuation of a second selected colour channel of the image. The second depth data can be filtered using the first depth data as a filtering guide to generate a depth map representing the scene depth of the image, which can be used to recover t(x) and thus J(x), thereby yielding a de-hazed and/or colour corrected version of the image. The depth map representing the scene depth of the image generated according to an example provides an improved estimate of both the range depth in an image as well as object boundaries.

In an example, the first depth estimate can be based on the so-called "Dark Channel Prior" (DCP), which is a statistical assumption based on the minimum intensity of a color channel in an image patch. The assumption exploits the fact that objects in a clear image patch have at least one color channel with very low intensity, but in a hazy patch all color channels will have higher intensity due to the addition of airlight. In other words, the minimum intensity in such a patch should have a very low value. This assumption, whilst observed with respect to outdoor images, can be used for images captured underwater since the underlying principle remains the same.

In an example, the second depth estimate can be based on the so-called "maximum intensity prior" (MIP), which, in general terms, is a methodology in which the maximum intensity of the red colour channel is compared to the maximum intensity in the green and blue colour channels over a small image patch of an image.

The concept of the DCP can be formalised as:

$$J^{dark}(x) = \min_{y \in \Omega(x)} \left( \min_{c \in R,G,B} J^c(y) \right)$$

where $J^c$ is a scene radiance for each colour channel (RGB) and $\Omega(x)$ is a local patch centred at x. Using this model, it follows that if J is a haze-free image the intensity of J is low and tends to zero ($J^{dark} \rightarrow 0$).

Referring to eqn. (1) above, and assuming that the transmission in the local patch $\Omega(x)$ is constant, the patch's transmission is referred to as $\tilde{t}(x)$. Taking the min (minimum) operation in the local patch on the haze imaging equation (1) therefore gives:

$$\min_{y \in \Omega(x)} (W^c(y)) = \tilde{t}(x) \min_{y \in \Omega(x)} (J^c(y)) + \left(1 - \tilde{t}(x)\right)A^c$$

which is equivalent to:

$$\min_{y \in \Omega(x)} \left( \frac{W^c(y)}{A^c} \right) = \tilde{t}(x) \min_{y \in \Omega(x)} \left( \frac{J^c(y)}{A^c} \right) + \left(1 - \tilde{t}(x)\right)$$

Taking the min operation among three colour channels on the above equation yields:

$$\min_c \left( \min_{y \in \Omega(x)} \left( \frac{W^c(y)}{A^c} \right) \right) = \tilde{t}(x) \min_c \left( \frac{J^c(y)}{A^c} \right) + \left(1 - \tilde{t}(x)\right) \quad (2)$$

Given the definition of $J^{dark}$ above, and noting that $A^c$ will always be positive leads to:

$$\min_c \left( \min_{y \in \Omega(x)} \left( \frac{J^c(y)}{A^c} \right) \right) = 0$$

From (2), it can therefore be seen that:

$$\tilde{t}(x) = 1 - \min_c \left( \min_{y \in \Omega(x)} \left( \frac{W^c(y)}{A^c} \right) \right) \quad (3)$$

Since $$\min_c \left( \min_{y \in \Omega(x)} \left( \frac{w^c(y)}{A^c} \right) \right)$$

is the dark channel of the normalised haze image $$\left(\frac{w^c(y)}{A^c}\right)$$

it directly provides the estimate of transmission.

However, depth estimation based on the DCP methodology suffers from range errors, which can lead to an inaccurate estimation of the transmission and therefore ultimately of the clear image.

According to an example, a modified version of the DCP can be used in order to generate the first depth data. The modified version still operates under the premise that at least one colour channel has some pixels whose intensity are close to zero. However, because of the nature of the medium in question, there is a wavelength dependence in the attenuation of light that should be taken into account. That is, the attention of light in water varies depending on the colour of the light, i.e., the wavelength.

Generally, in an underwater medium, the red colour channel is attenuated at a much higher rate than the green or blue colour channels. Accordingly, DCP can sometimes fail because the red colour channel has attenuated to the point where it may be dark or nearly dark, thereby corrupting the calculation of the transmission estimate. For this reason, a modified DCP methodology for underwater use (UDCP) has been employed in which only the green and blue colour channels are considered, such that:

$$J^{UDCP}(x) = \min_{y\in\Omega(x)}\left(\min_{c\in G,B} J^c(y)\right)$$

However, depending on the nature of the medium in question, it is possible that blanket rejection of the red colour channel in favour of the other two may not yield the optimum results. Thus, according to an example, a colour channel is selected for use as the basis of a modified DCP (MDCP) procedure in order to determine the first depth data.

According to an example, the selection of a colour channel proceeds by determining the most attenuated colour channel (MAC) for an image captured in the participating medium. A variance map for the image for each colour channel is determined, which provides a measure of the degree to which a particular colour channel varies across the image.

More specifically, in an example, for each colour channel $c\in\{r, g, b\}$ in an image, a variance map $v_c(x)$ can be determined using a moving variance with a fixed window size. If a number of pixels in area of pixels centred on x have a variance such that $v_c(x) < t$, where t is a preselected variance threshold (e.g., between 1-50%, such as 10% for example, variance from the hue of a pixel at x), and the area is less than 20% of the area of the image, there is assumed to be no colour variance in this region. With this assumption in place, a weight map $w_c(x)$ is calculated according to:

$$w_c(x) = \frac{t - \min(v_c(x), t)}{t}$$

The weighted median $$B_c^\infty$$

of the image, W(x), in a colour channel c is calculated using the estimated value $w_c(x)$ in order to determine $$B^\infty = (B_r, B_g, B_b)^T.$$

In an example, the MAC, c', for an image is given by:

$$c' = \arg\min_{c\in\{r,g,b\}}\ \operatorname*{med}_x\ W_c(x)$$

Using the determined MAC of an image, and referring to equation (3) above for example, the MDCP according to an example can thus be used to obtain the transmission, $t_{MDCP}$ (x), for the image according to:

$$\hat{t}_{MDCP}(x) = 1 - \min_{y\in\Omega(x)}\min_{c\neq c'}\frac{W_c(y)}{B_c^\infty}$$

The transmission, $\hat{t}_{MDCP}(x)$, provides an estimate of the depth of the image in question that can be used to recover the clean image, i.e., to provide a dehazed and/or colour corrected version of the captured image.

In terms of the second depth data, which can be calculated on the basis of a maximum attenuation of a second selected colour channel of the image, the MIP being an example of this as mentioned above, it is observed that the attention of light in water varies depending on the colour of the light. Specifically, the red colour channel is attenuated at a much higher rate than green or blue colour channels. Accordingly, the MIP compares the maximum intensity of the red colour channel to the maximum intensity in the green and blue colour channels, over a small image patch.

The difference between the maximum red channel intensity and the maximum of the green and blue channel intensity can be formalised as:

$$D(x) = \max_{x\in\Omega,c\in r} W_c(x) - \max_{x\in\Omega,c\in\{b,g\}} W_c(x)$$

where $W_c(x)$ refers to a pixel x in colour channel $c\in\{r, g, b\}$ in the observed image, and $\Omega$ refers to a patch in the image. The estimated transmission, t, is found by shifting the values of D so that the largest difference between colour channels, which represents the closest point in the foreground, is one:

$$\hat{t}(x) = D(x) + \left(1 - \max_x D(x)\right)$$

According to an example, a modified version of the MIP (M-MIP) can be used in order to determine the second depth data. As noted above, the MAC may be different depending on the prevailing conditions. Accordingly, comparison of the red colour channel to the other colour channels can provide sub-optimal results in certain situations.

The channel intensity, D'(x), which represents a transmission map for the image, can therefore be provided, according to an example, by:

$$D'(x) = \max_{y\in\Omega(x)} W_{c'}(y) - \max_{y\in\Omega(x)\ c\neq c'} W_c(y)$$

Therefore, the estimated transmission, $\hat{t}_{M\text{-}MIP}(x)$, is:

$$\hat{t}_{M\text{-}MIP}(x) = D'(x) + \left(1 - \max_x D'(x)\right)$$

The transmission, $\hat{t}_{M\text{-}MIP}(x)$, provides another estimate of the depth of the image in question that can be used to recover the clean image, i.e., to provide a dehazed and/or colour corrected version of the captured image.

According to an example, the second depth data, based on the transmission $\hat{t}_{M\text{-}MIP}(x)$ as described above for example, can be filtered using the first depth data based on the transmission $\hat{t}_{MDCP}(x)$ as a guide. That is, a depth map for an image derived from the second depth data can be filtered using a depth map derived from the first depth data.

FIG. 1 is a schematic representation of a method for generating a depth map from an image according to an example. In block 101, image data representing a captured image and comprising data representing the observed image intensity, $W(x)$, is provided. The image data 101 may be generated using an imaging module 102 of user equipment 104, such as a smart phone that may be capable of recording images and/or video underwater for example. The image data 101 is used to determine the MAC 103 according to a process as described above for example. Data representing the MAC 103, as well as the image data 101 is used to generate first depth data 105 and second depth data 107 for the captured image. In the example of FIG. 1, the first depth data 105 is used a guide to filter the second depth data 107 in order to generate a depth map 111 for the captured image.

As described above, the depth map 111 can be generated using two depth data sources with complementary characteristics. According to an example, one source of depth data (e.g., the first depth data) is based on the DCP or a modification of the DCP methodology as described above, and the other (e.g., the second depth data) is based on the MIP or a modification of the MIP methodology as described above. The DCP-based map has better spatial resolution, whereas the MIP-based map has better range value determination. The combination of the two techniques is performed using a guided filter-based process, and the resulting depth map 111 is superior to both input range maps.

Figure 2:
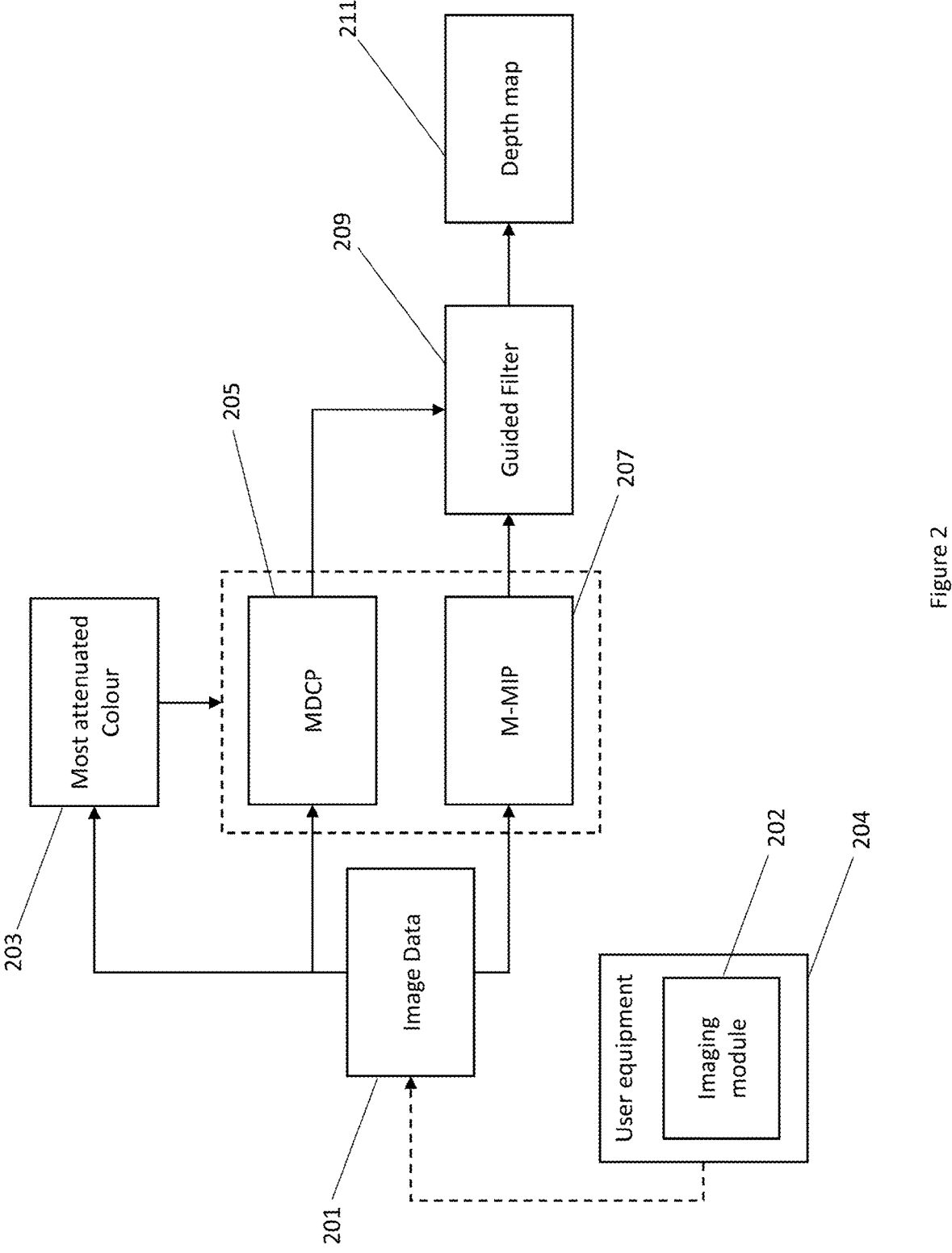
FIG. 2 is a schematic representation of a method for generating a depth map from an image according to an example.

FIG. 2 is a schematic representation of a method for generating a depth map from an image according to an example. Similarly to that described with reference to FIG. 1, image data representing a captured image and comprising data representing the observed image intensity, $W(x)$, is provided. The image data 201 may again be generated using an imaging module 202 of user equipment 204. The image data 201 is used to determine the MAC 203 according to a process as described above for example. Data representing the MAC 203, as well as the image data 201 is used to generate first depth data 205 and second depth data 207 for the captured image. The first depth data 205 is generated using a modified DCP (MDCP) process as described above in order to calculate an estimate for the transmission map:

$$\hat{t}_{MDCP}(x) = 1 - \min_{y \in \Omega(x)} \min_{c \neq c'} \frac{W_c(y)}{B_c^\infty}$$

The transmission map can be contrasted. For example, the luminance of pixels in the transmission map can be linearly transformed in the range [0, 1]. The transmission map can then be morphologically closed. That is, small dark spots can be removed by a process of dilation and erosion using a suitable structuring element which is a template defining a region of interest or neighborhood around a pixel of the transmission map and that is used to probe the transmission map. Morphological closing removes small dark spots since dark regions that are smaller than the structuring element are removed. In addition, the process connects small bright cracks.

The second depth data 207 is generated using a modified MIP (M-MIP) process as described above in order to calculate an estimate for the transmission map:

$$\hat{t}_{M\text{-}MIP}(x) = D'(x) + \left(1 - \max_x D'(x)\right)$$

In the example of FIG. 2, the first depth data 205 is used a guide to filter the second depth data 207 in order to generate a depth map 211 for the captured image. The M-MIP transmission map can be contrasted. For example, the luminance of pixels in the transmission map can be linearly transformed in the range [0, 1]. In an example, the transmission map can be morphologically opened. This can be done using, e.g., a "plus"-shaped structuring element such as a one defined by the approximation of the disk formed by overlapping two rectangular elements and then taking the pixelwise maximum.

According to an example, the depth map 111; 211 is obtained from a combination of the two depth maps defined by the depth data 105, 107; 205, 207 using a guided filter in which, for example with reference to FIG. 2, the transmission map generated using M-MIP is guided by the transmission map generated using MDCP.

The transmission map generated using MDCP forms a guidance image I, and the transmission map generated using M-MIP forms an input image p such that:

$$q_i = \sum_j W_{ij}(I)p_j$$

where q is the output image (i.e., the depth map 111; 211). Accordingly, the filtering output at a pixel i is expressed as a weighted average where i and j are pixel indexes and the filter kernel Wij is a function of the guidance image I and can be independent of p.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, user equipment such as a smart device, e.g., a smart phone, a special purpose computer, an embedded processor or processors of other programmable data processing devices or apparatus to realize the functions described in the description and diagrams. In particular, a processor or processing apparatus may execute the machine-readable instructions. Thus, modules of apparatus (for example, a module implementing a function to generate depth data) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode. For example, the instructions may be provided on a non-transitory computer readable storage medium encoded with instructions, executable by a processor.

Figure 3:
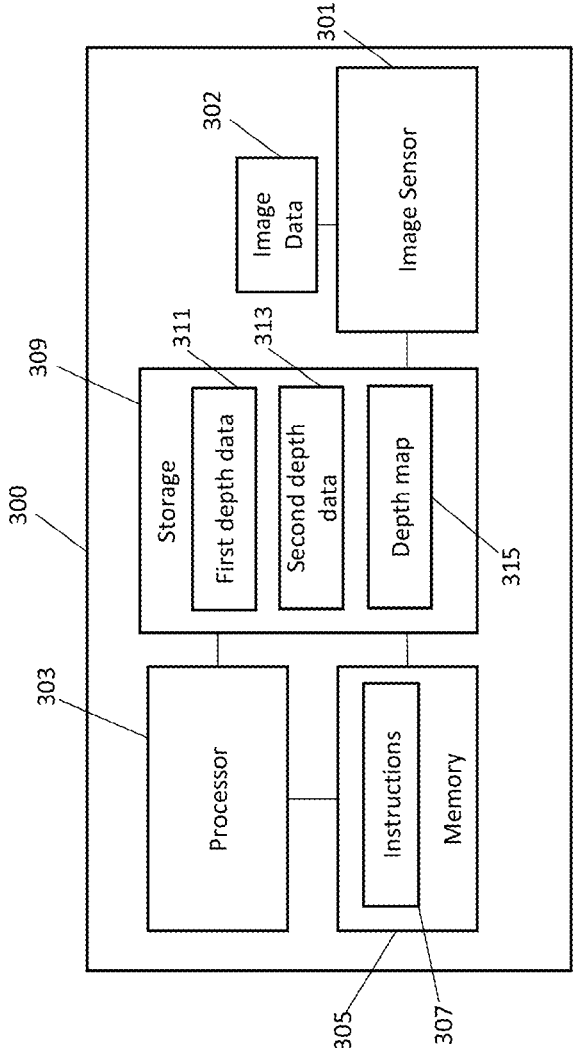
FIG. 3 is a schematic representation of a machine forming user equipment according to an example.

FIG. 3 is a schematic representation of a machine forming user equipment, or an apparatus according to example. The user equipment 300 comprises an image sensor 301 configured to generate image data 302 representing an image. The user equipment 300, which can be a smart device, such as a smart phone for example, comprises a processor 303, and a memory 305 to store instructions 307, executable by the processor 303. The user equipment comprises a storage 309 that can be used to store the first depth data 311, second depth data 313 and the depth map 315, which can be calculated according to the examples described above with reference to FIGS. 1 and 2. The instructions 307, executable by the processor 303, can cause the user equipment 300 to determine, on the basis of the image data 302, a colour channel representing a most attenuated colour channel of the image; using the colour channel, generate first 311 and second 313 depth map data for the image, the first depth map data defined by a minimum intensity of the colour channel, the second depth map defined by a difference in attenuation between different colour channels of the image at least of which comprising the colour channel representing a most attenuated colour channel of the image; and filter the second depth data 313 using the first depth data 311 as a guide to generate a depth map 315 for the image.

Accordingly, the user equipment 300 can implement a method for generating a depth map 315 from an image captured using the image sensor 301. Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Figure 4:
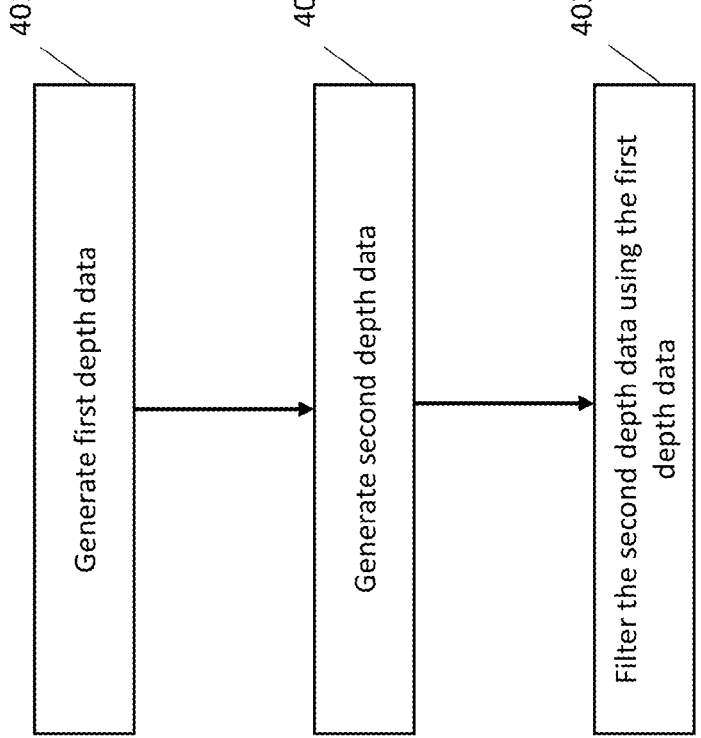
FIG. 4 is a flow diagram of a method for generating a depth map from an image according to an example.
Figure 4:
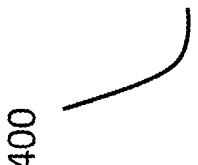

FIG. 4 is a flow diagram of a method 400 for generating a depth map from an image according to an example.

In a step 401 first depth data representing a first measure proportional to depth for pixels in the image is generated using a first selected colour channel of the image, the first depth data calculated on the basis of a minimum intensity of the first selected colour channel of the image;

In a step 402 second depth data representing a second measure proportional to depth for pixels in the image is generated, the second depth data calculated on the basis of a maximum attenuation of a second selected colour channel of the image; and In a step 403 the second depth data is filtered using the first depth data as a filtering guide to generate the depth map Further, the teachings herein may be implemented in the form of a computer or software product, such as a non-transitory machine-readable storage medium, the computer software or product being stored in a storage medium and comprising a plurality of instructions, e.g., machine readable instructions, for making a computer device implement the methods recited in the examples of the present disclosure.

In some examples, some methods can be performed in a cloud-computing or network-based environment. Cloud-computing environments may provide various services and applications via the Internet. These cloud-based services (e.g., software as a service, platform as a service, infrastructure as a service, etc.) may be accessible through a web browser or other remote interface of the user equipment 300 for example. Various functions described herein may be provided through a remote desktop environment or any other cloud-based computing environment.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for variable-length chunking for deduplication. As another example, one or more of the modules described herein may transform a volume of data into a volume of deduplicated variable-length data chunks.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

What is claimed is:

1. A method for generating a depth map from an image, the method comprising:

generating first depth data representing a first measure proportional to depth for pixels in the image using a first selected colour channel of the image, wherein the first depth data is calculated based on a minimum intensity of the first selected colour channel of the image, wherein the first depth data is generated based on a modified dark channel prior process, the modified dark channel prior process comprising:

determining a most attenuated colour channel for the image by, for each colour channel in the image, determining a variance map using a moving variance with a fixed window size and a preselected variance threshold, wherein the first selected colour channel is the most attenuated colour channel;

generating second depth data representing a second measure proportional to depth for pixels in the image, wherein the second depth data is calculated based on a maximum attenuation of a second selected colour channel of the image; and filtering the second depth data using the first depth data as a filtering guide to generate the depth map.

2. The method as claimed in claim 1, wherein the depth map is generated from a single image.

3. The method as claimed in claim 1, wherein at least one of the first and the second selected colour channels of the image is a colour channel of the image with a largest amount of attenuation.

4. The method as claimed in claim 1, wherein at least one of the first and the second selected colour channels of the image is determined based on an image characteristic.

5. The method as claimed in claim 4, wherein the image characteristic comprises at least one of a dominant image colour, hue, or tone.

6. The method as claimed in claim 1, wherein determining the first depth data further comprises:

determining a minimum intensity for each pixel in the image in the first selected colour channel to generate an intermediate image representation; and filtering the intermediate image representation using a selected filtering kernel to generate the first depth data.

7. The method as claimed in claim 6, wherein the selected filtering kernel comprises a windowed morphological filter or a rank filter.

8. The method as claimed in claim 1, wherein determining the second depth data further comprises:

calculating a value representing a difference between a most intense value in the second selected colour channel of the image and a secondary value in a further selected colour channel of the image.

9. The method as claimed in claim 8, wherein the secondary value comprises a most intense value in the further selected colour channel of the image.

10. The method as claimed in claim 8, wherein the value is calculated over a set of colour channels of the image.

11. The method as claimed in claim 1, wherein the second depth data is generated based on a modified maximum intensity prior comprising a channel intensity, $D'(x)$, that represents a transmission map for the image and is provided by:

$$D'(x) = \max_{y \in \Omega(x)} W_{c'}(y) - \max_{y \in \Omega(x), c \neq c'} W_c(y),$$

wherein an estimated $\hat{t}_{M\text{-}MIP}(x)$, is:

$$\hat{t}_{M\text{-}MIP}(x) = D'(x) + \left(1 - \max_x D'(x)\right),$$

wherein $\hat{t}_{M\text{-}MIP}(x)$ is another estimate of a depth of the image.

12. The method as claimed in claim 1, wherein at least one of the first and the second selected colour channels of the image is determined using a colour sensor.

13. A non-transitory machine-readable storage medium encoded with instructions for generating a depth map for an image, the instructions executable by a processor of a machine whereby to cause the machine to execute the method of claim 1.

14. A user equipment comprising an image sensor configured to generate image data representing an image, the user equipment further comprising a processor, and a memory to store instructions, executable by the processor, whereby to cause the user equipment to:

determine, based on the image data, a colour channel representing a most attenuated colour channel of the image;

generate a first and a second depth map data for the image using the colour channel, wherein the first depth map data is defined by a minimum intensity of the colour channel, wherein the second depth map is defined by a difference in attenuation between different colour channels of the image, and wherein at least one of the different colour channels comprises the colour channel representing the most attenuated colour channel of the image; and filter the second depth data using the first depth data as a guide to generate a depth map for the image, wherein the first depth map data is generated based on a modified dark channel prior process, the modified dark channel prior process comprising:

determining the most attenuated colour channel for the image by, for each colour channel in the image, determining a variance map using a moving variance with a fixed window size and a preselected variance threshold.

15. An apparatus for generating a depth map from an image, the apparatus being configured to:

generate first depth data representing a first measure proportional to depth for pixels in the image using a first selected colour channel of the image, wherein the first depth data is calculated based on a minimum intensity of the first selected colour channel of the image, wherein the first depth data is generated based on a modified dark channel prior process, the modified dark channel prior process comprising:

determining a most attenuated colour channel for the image by, for each colour channel in the image, determining a variance map using a moving variance with a fixed window size and a preselected variance threshold, wherein the first selected colour channel is the most attenuated colour channel;

generate second depth data representing a second measure proportional to depth for pixels in the image, wherein the second depth data is calculated based on a maximum attenuation of a second selected colour channel of the image; and filter the second depth data using the first depth data as a filtering guide to generate the depth map.

16. The apparatus as claimed in claim 15, wherein the depth map is generated from a single image.

17. The apparatus as claimed in claim 15, further comprising:

an imaging module to generate image data representing the image.

18. The apparatus as claimed in claim 15, wherein the apparatus is further configured to:

determine at least one of the first and the second selected colour channels of the image based on an image characteristic, such as at least one of a dominant image colour, hue or tone.

19. The apparatus as claimed in claim 15, wherein the apparatus is further configured to:

determine a minimum intensity for each pixel in the image in the first selected colour channel to generate an intermediate image representation; and filter the intermediate image representation using a selected filtering kernel to generate the first depth data.

20. The method as claimed in claim 1, wherein the modified dark channel prior process further comprises calculating a weight map based on the variance map and the preselected variance threshold to obtain a transmission for the image that provides an estimate of a depth of the image.

\* \* \* \* \*